United States Patent
Shi et al.

(10) Patent No.: US 10,142,883 B2
(45) Date of Patent: Nov. 27, 2018

(54) NETWORK TROUBLESHOOTING METHOD AND DEVICE

(71) Applicant: Huawei Technologies Co., Ltd., Shenzhen (CN)

(72) Inventors: Xiaoyan Shi, Beijing (CN); Wanqiang Zhang, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 77 days.

(21) Appl. No.: 15/242,174

(22) Filed: Aug. 19, 2016

(65) Prior Publication Data

US 2016/0360441 A1    Dec. 8, 2016

Related U.S. Application Data

(63) Continuation of application No. PCT/CN2014/072396, filed on Feb. 21, 2014.

(51) Int. Cl.
*H04W 28/04* (2009.01)
*H04W 76/18* (2018.01)
(Continued)

(52) U.S. Cl.
CPC ....... *H04W 28/04* (2013.01); *H04W 52/0212* (2013.01); *H04W 76/18* (2018.02);
(Continued)

(58) Field of Classification Search
None
See application file for complete search history.

(56) References Cited

U.S. PATENT DOCUMENTS

2009/0046655 A1    2/2009 Zhao et al.
2012/0300640 A1*   11/2012 Okabe ............... H04W 76/028
                                                  370/241
(Continued)

FOREIGN PATENT DOCUMENTS

CN    101540989 A    9/2009
CN    101730124 A    6/2010
(Continued)

OTHER PUBLICATIONS

EPO machine-generated English translation for CN 103338500 A.*
(Continued)

*Primary Examiner* — James P Duffy
(74) *Attorney, Agent, or Firm* — Leydig, Voit & Mayer, Ltd.

(57) ABSTRACT

Embodiments of the present invention relate to the communications field, and provide a network troubleshooting method and device, which can determine a service recovery policy according to a power saving state of user equipment after a mobility management entity is faulty, and can reduce unnecessary consumption of network resources. A specific solution is: obtaining a power saving state of user equipment; and if it is detected that a mobility management entity MME managing the user equipment is faulty, selecting a service recovery policy for the user equipment according to the power saving state, where the service recovery policy includes: not initiating service recovery or initiating service recovery. The present invention is used to process a fault of an MME.

17 Claims, 6 Drawing Sheets

(51) Int. Cl.
*H04W 76/28* (2018.01)
*H04W 52/02* (2009.01)

(52) U.S. Cl.
CPC ............. *H04W 76/28* (2018.02); *Y02D 70/00* (2018.01); *Y02D 70/24* (2018.01)

(56) References Cited

U.S. PATENT DOCUMENTS

2012/0300685 A1* 11/2012 Kim ..................... H04W 68/02
370/311
2013/0155954 A1 6/2013 Wang et al.
2015/0139054 A1* 5/2015 Wu .................. H04W 52/0225
370/311

FOREIGN PATENT DOCUMENTS

CN 102083112 A 6/2011
CN 103338500 A * 10/2013 ........ H04W 52/0225
WO WO 2009025899 A1 2/2009
WO WO 2013177992 A1 * 12/2013 ........ H04W 52/0225

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 12)," 3GPP TS 23.401; V12.3.0, pp. 1-302, 3rd Generation Partnership Project, Valbonne, France (Dec. 2013).

"3rd Generation Partnership Project; Technical Specification Group Core Network and Terminals; Non-Access-Stratum (NAS) protocol for Evolved Packet System (EPS); Stage 3 (Release 12)," 3GPP TS 24. 301, V12.3.0, pp. 1-353, 3rd Generation Partnership Project, Valbonne, France (Dec. 2013).

* cited by examiner

NETWORK TROUBLESHOOTING METHOD AND DEVICE

CROSS-REFERENCE TO RELATED APPLICATIONS

This application is a continuation of International Application No. PCT/CN2014/072396, filed on Feb. 21, 2014, which is hereby incorporated by reference in its entirety.

TECHNICAL FIELD

The present invention relates to the communications field, and in particular, to a network troubleshooting method and device.

BACKGROUND

An existing evolved packet system (Evolved Packet System, EPS) wireless network architecture mainly includes:

An evolved universal terrestrial radio access network (Evolved universal terrestrial radio access network, E-UTRAN) is a network including a plurality of evolved base stations (Evolved Node B, eNodeB), and implements a wireless physical layer function, and functions of resource scheduling and wireless resource management, radio access control, and mobility management. An eNodeB is connected to a serving gateway (Serving Gateway, S-GW) by means of an S1 user plane interface S1-U, to transfer user data, and is connected to a mobility management entity (Mobility Management Entity, MME) by means of an S1 control plane interface S1-MME, to implement a radio access bearer control function and the like by using an S1 Application Protocol S1-AP protocol.

The MME is mainly responsible for all control plane functions of user session management, including non-access stratum (Non-Access Stratum) NAS signaling and security, management of a tracking area list (Tracking Area List), and selecting a packet data network gateway (Packet Data Network Gateway, P-GW) and an S-GW.

The S-GW is mainly responsible for data transmission, data forwarding, and route switching of user equipment, and serves as a local mobility anchor point when the user equipment is handed over between eNodeBs (for each user equipment, only one S-GW serves the user equipment at each moment).

The P-GW serves as an anchor point for connecting to a packet data network (Packet Data Network, PDN), and is responsible for allocating an Internet Protocol (Internet Protocol, IP) address to the user equipment, filtering a data packet for the user equipment, performing rate control, generating charging information, and the like.

The user equipment (User Equipment, UE) is connected to the EPS network and establishes a PDN connection by means of an attach procedure. In this process, the PGW allocates an IP address to the user equipment, and the user equipment is connected to an external network by means of the PDN connection and transmits data to the external network. If no data transmission is performed for a long time, the user equipment enters an idle state (Idle). In this case, user equipment context on the eNodeB is deleted, and the MME cannot exactly know an eNodeB covering the user equipment. When the EPS network receives a downlink data packet of the user, a network side needs to first page the user equipment, and after the user equipment is switched to a connected state (Connected), send the downlink data of the user to the user equipment.

To reduce power consumption of the user equipment, a power saving mode (Power Saving Mode) and a discontinuous reception mode (Discontinuous Reception, DRX) are used in the prior art. The power saving mode refers to: the user equipment enters a sleep state, and in this state, the user equipment cannot respond to paging of the network side. The discontinuous reception mode refers to: the user equipment and the network side negotiate to use a relatively long DRX cycle value, to implement power saving for the user equipment.

In the prior art, when the user equipment enters the power saving mode, the user equipment cannot respond to the paging. When the user equipment enters the discontinuous reception mode, the MME needs to know a discontinuous reception cycle value of the user equipment, so as to correctly page the user equipment. However, because if the MME is faulty, current state information of the user equipment may be lost, the MME receiving a downlink data notification message (an MME after restart or another MME) cannot correctly page the user equipment, which causes unnecessary consumption of network resources, and even cannot implement service recovery.

SUMMARY

Embodiments of the present invention provide a network troubleshooting method and device, which can determine a service recovery policy according to a power saving state of user equipment after an MME is faulty, and can reduce unnecessary consumption of network resources.

To achieve the foregoing objective, the following technical solutions are used in the embodiments of the present invention:

According to a first aspect, an embodiment of the present invention provides a network troubleshooting device, where the device includes:

an obtaining unit, configured to obtain a power saving state of user equipment; and a selection unit, configured to: if it is detected that a mobility management entity MME managing the user equipment is faulty, select a service recovery policy for the user equipment according to the power saving state, where the service recovery policy includes: not initiating service recovery or initiating service recovery.

With reference to the first aspect, in a first possible implementation manner, the power saving state includes:

the user equipment activates a power saving mode; or the user equipment activates a discontinuous reception mode and a discontinuous reception cycle value is unknown; or the user equipment activates a discontinuous reception mode and a discontinuous reception cycle value is known.

With reference to the first aspect or the first possible implementation manner of the first aspect, in a second possible implementation manner, the obtaining unit is specifically configured to:

in an attach procedure or a routing area update procedure, receive an indication message that is delivered by the MME and that includes the power saving state, where the indication message includes at least one of a create session request message or a modify bearer request message.

With reference to the first possible implementation manner of the first aspect, in a third possible implementation manner, the selection unit is specifically configured to:

if the power saving state of the user equipment is that the user equipment activates the power saving mode, or the user equipment activates the discontinuous reception mode and the discontinuous reception cycle value is unknown, skip initiating service recovery for the user equipment, and skip paging the user equipment; or if the power saving state of the user equipment is that the user equipment activates the discontinuous reception mode and the discontinuous reception cycle value is known, initiate service recovery for the user equipment, so that the MME pages the user equipment according to the discontinuous reception cycle value.

With reference to the third possible implementation manner of the first aspect, in a fourth possible implementation manner, the selection unit is further specifically configured to:

if the power saving state of the user equipment is that the user equipment activates the power saving mode, or the user equipment activates the discontinuous reception mode and the discontinuous reception cycle value is unknown, skip initiating service recovery for another user equipment except the user equipment, where the another user equipment is managed by the faulty MME and whose power saving state is the same as the power saving state of the user equipment.

With reference to the third possible implementation manner of the first aspect, in a fifth possible implementation manner, the selection unit is further specifically configured to:

send a downlink data notification message including the discontinuous reception cycle value to the MME, so that the MME pages the user equipment according to the received discontinuous reception cycle value.

According to a second aspect, an embodiment of the present invention provides a network troubleshooting method, where the method includes:

obtaining a power saving state of user equipment; and if it is detected that a mobility management entity MME managing the user equipment is faulty, selecting a service recovery policy for the user equipment according to the power saving state, where the service recovery policy includes: not initiating service recovery or initiating service recovery.

With reference to the second aspect, in a first possible implementation manner, the power saving state includes:

the user equipment activates a power saving mode; or the user equipment activates a discontinuous reception mode and a discontinuous reception cycle value is unknown; or the user equipment activates a discontinuous reception mode and a discontinuous reception cycle value is known.

With reference to the second aspect or the first possible implementation manner of the second aspect, in a second possible implementation manner, the obtaining a power saving state of user equipment includes:

in an attach procedure or a routing area update procedure, receiving an indication message that is delivered by the MME and that includes the power saving state, where the indication message includes at least one of a create session request message or a modify bearer request message.

With reference to the first possible implementation manner of the second aspect, in a third possible implementation manner, the selecting a service recovery policy according to the power saving state includes:

if the power saving state of the user equipment is that the user equipment activates the power saving mode, or the user equipment activates the discontinuous reception mode and the discontinuous reception cycle value is unknown, skipping initiating service recovery for the user equipment, and skipping paging the user equipment; or if the power saving state of the user equipment is that the user equipment activates the discontinuous reception mode and the discontinuous reception cycle value is known, initiating service recovery for the user equipment, so that the MME pages the user equipment according to the discontinuous reception cycle value.

With reference to the third possible implementation manner of the second aspect, in a fourth possible implementation manner, the selecting a service recovery policy according to the power saving state further includes:

if the power saving state of the user equipment is that the user equipment activates the power saving mode, or the user equipment activates the discontinuous reception mode and the discontinuous reception cycle value is unknown, skipping initiating service recovery for another user equipment except the user equipment, where the another user equipment is managed by the faulty MME and whose power saving state is the same as the power saving state of the user equipment.

With reference to the third possible implementation manner of the second aspect, in a fifth possible implementation manner, the initiating service recovery for the user equipment, so that the MME pages the user equipment according to the discontinuous reception cycle value includes:

sending a downlink data notification message including the discontinuous reception cycle value to the MME, so that the MME pages the user equipment according to the received discontinuous reception cycle value.

According to a third aspect, a network troubleshooting device is provided, where the network troubleshooting device includes: a communications interface, a memory, and a processor, where the communications interface is configured to communicate with a network element, the memory is configured to store computer code, and the processor executes the computer code to:

obtain a power saving state of user equipment; and if it is detected that a mobility management entity MME managing the user equipment is faulty, select a service recovery policy for the user equipment according to the power saving state, where the service recovery policy includes: not initiating service recovery or initiating service recovery.

With reference to the third aspect, in a first possible implementation manner, the power saving state includes:

the user equipment activates a power saving mode; or the user equipment activates a discontinuous reception mode and a discontinuous reception cycle value is unknown; or the user equipment activates a discontinuous reception mode and a discontinuous reception cycle value is known.

With reference to the third aspect or the first possible implementation manner of the third aspect, in a second possible implementation manner, the processor executes the computer code to further:

in an attach procedure or a routing area update procedure, receive an indication message that is delivered by the MME and that includes the power saving state, where the indication message includes at least one of a create session request message or a modify bearer request message.

With reference to the first possible implementation manner of the third aspect, in a third possible implementation manner, the processor executes the computer code to further:

if the power saving state of the user equipment is that the user equipment activates the power saving mode, or the user equipment activates the discontinuous reception mode and the discontinuous reception cycle value is unknown, skip initiating service recovery for the user equipment, and skip paging the user equipment; or if the power saving state of the user equipment is that the user equipment activates the discontinuous reception mode and the discontinuous reception cycle value is known, initiate service recovery for the user equipment, so that the MME pages the user equipment according to the discontinuous reception cycle value.

With reference to the third possible implementation manner of the third aspect, in a fourth possible implementation manner, the processor executes the computer code to further:

if the power saving state of the user equipment is that the user equipment activates the power saving mode, or the user equipment activates the discontinuous reception mode and the discontinuous reception cycle value is unknown, skip initiating service recovery for another user equipment except the user equipment, where the another user equipment is managed by the faulty MME and whose power saving state is the same as the power saving state of the user equipment.

With reference to the third possible implementation manner of the third aspect, in a fifth possible implementation manner, the processor executes the computer code to further:

send a downlink data notification message including the discontinuous reception cycle value to the MME, so that the MME pages the user equipment according to the received discontinuous reception cycle value.

In the network troubleshooting method and device provided in the embodiments of the present invention, a power saving state of user equipment is obtained; and if it is detected that a mobility management entity MME managing the user equipment is faulty, a service recovery policy is selected for the user equipment according to the power saving state, where the service recovery policy includes: not initiating service recovery or initiating service recovery. Therefore, the service recovery policy can be determined according to the power saving state of the user equipment after the mobility management entity is faulty, and unnecessary consumption of network resources can be reduced.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
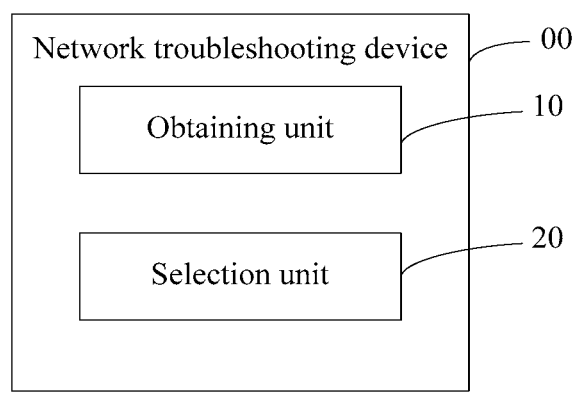
FIG. 1 is a schematic structural diagram of a network troubleshooting device according to an embodiment of the present invention.

An embodiment of the present invention provides a network troubleshooting device 00. As shown in FIG. 1, the device 00 includes an obtaining unit 10 and a selection unit 20.

The obtaining unit 10 is configured to obtain a power saving state of user equipment.

The power saving state of the user equipment includes:

the user equipment activates a power saving mode; or the user equipment activates a discontinuous reception mode and a discontinuous reception cycle value is unknown; or the user equipment activates a discontinuous reception mode and a discontinuous reception cycle value is known.

The selection unit 20 is configured to: if it is detected that a mobility management entity MME managing the user equipment is faulty, select a service recovery policy for the user equipment according to the power saving state, where the service recovery policy includes: not initiating service recovery or initiating service recovery.

Optionally, the obtaining unit 10 is specifically configured to:

in an attach procedure or a routing area update procedure, receive an indication message that is delivered by the MME and that includes the power saving state, where the indication message includes at least one of a create session request message or a modify bearer request message.

Specifically, the power saving state of the user equipment may be obtained in the attach procedure of the user equipment. In the attach procedure, the MME receives an attach request message that is sent by the user equipment and that includes the power saving state; the MME delivers the indication message including the power saving state, where the indication message includes at least one of a create session request message or a modify bearer request message; and when the indication message is received, the power saving state is obtained.

Figure 2:
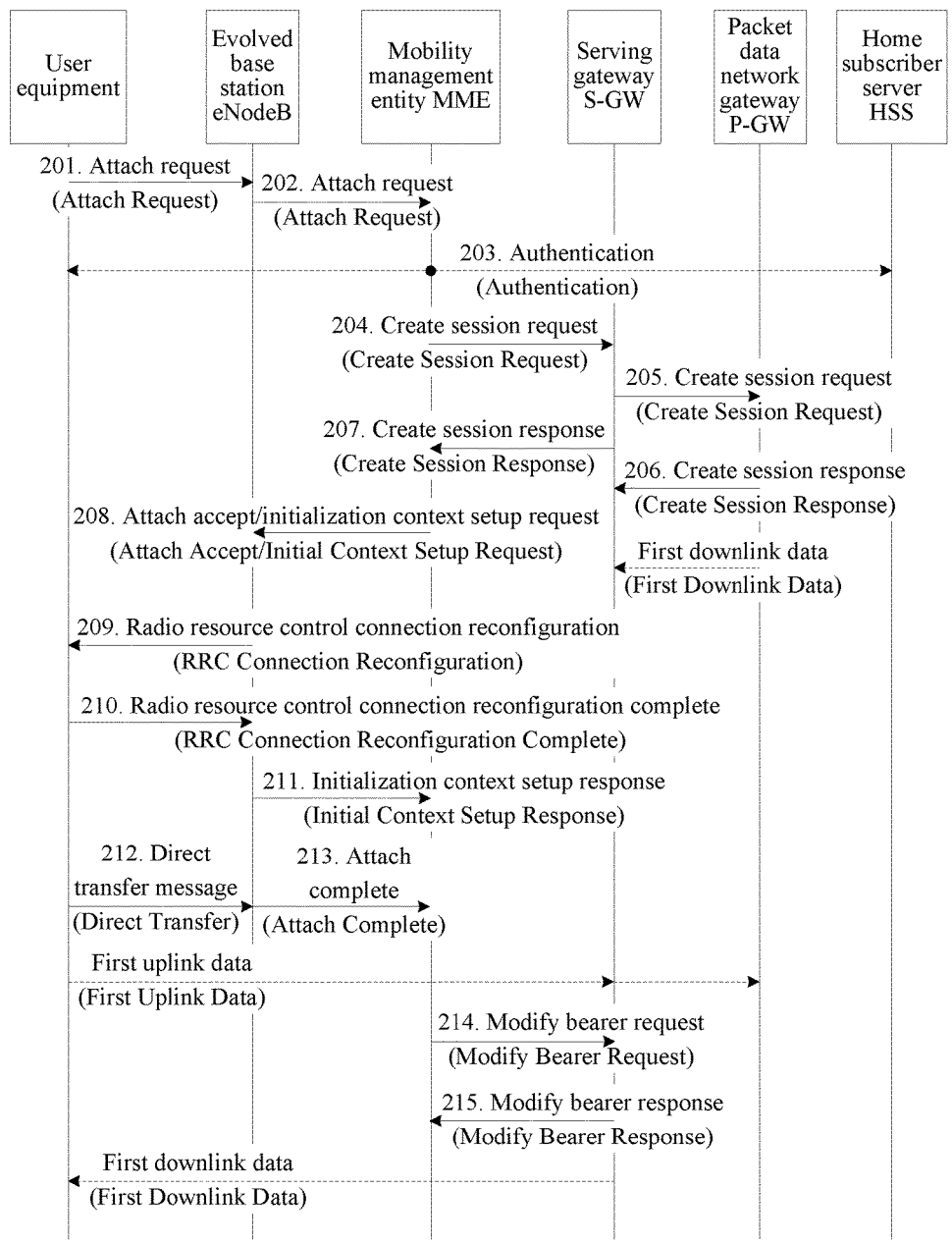
FIG. 2 is a schematic diagram of an attach procedure of user equipment in the prior art.

The attach procedure of a user equipment is shown in FIG. 2, and the procedure includes:

201: The user equipment sends an attach request message to an eNodeB, where the request message carries information, such as an international mobile subscriber identity (International Mobile Subscriber Identity, IMSI) and a security parameter.

202: The eNodeB selects an MME for the user equipment, the eNodeB may select the MME according to a network topology, the eNodeB includes the attach request message sent by the user equipment in an S1-MME control message and forwards the S1-MME control message to the MME, and adds information, such as an E-UTRAN cell global identifier (E-UTRAN Cell Global Identifier, ECGI) of the user equipment, to the S1-MME control message.

203: The MME and a home subscriber server (Home Subscriber Server, HSS) implement authentication and NAS security setting on the user equipment, for example, integrity protection and encryption.

204: The MME selects an S-GW and a P-GW, allocates an EPS bearer identity of a default bearer to the user equipment, and then sends a create session request to the S-GW, where the request carries an IMSI, an address of the P-GW, an access technology type, default bearer quality of service (Quality of Service, QoS), an EPS bearer identity, and the ECGI of the user equipment.

205: The S-GW creates context information of a default bearer (for example, allocates a user plane TEID or the like to the default bearer), and sends a create session request to the P-GW (the address of the P-GW is obtained in step 204), where the message carries the IMSI, a user plane address of the S-GW, a user plane tunnel end point identifier (Tunnel End Point Identifier, TEID) of the S-GW, the access technology type, the default bearer QoS, the EPS bearer identity, and the ECGI of the user equipment; and from this step, the S-GW starts to temporarily store a downlink data packet received from the P-GW, until the packet is forwarded to the eNodeB after step 215.

206: The P-GW creates context information of the default bearer (for example, allocates a user plane TEID or the like to the default bearer), generates a charging identifier of the default bearer, and returns a create session response message to the S-GW, where the message carries information, such as the user plane address of the P-GW, the user plane TEID of the P-GW, the EPS bearer identity, and a PDN address; and from this step, the P-GW starts to forward the downlink data packet.

207: The S-GW returns a create session response to the MME, where the message carries the PDN address, the user plane address (used for an S1-U interface) of the S-GW, the user plane TEID (used for the S1-U interface) of the S-GW, the EPS bearer QoS, the EPS bearer identity, and the like.

208: The MME sends an attach accept message to the eNodeB, where the message carries information, such as the PDN address, the EPS bearer identity, and the EPS bearer QoS, the message is included in an initialization context setup request (the S1-MME control message) by the MME, and the initialization context setup request also carries the EPS bearer QoS, the EPS bearer identity, the user plane address (used for the S1-U interface) of the S-GW, and the user plane TEID (used for the S1-U interface) of the S-GW.

209: The eNodeB sends a radio resource control protocol (Radio Resource Control, RRC) connection reconfiguration message, where the message carries the attach accept message and an EPS radio bearer identity.

210: The user equipment sends an RRC connection reconfiguration end message to the eNodeB.

211: The eNodeB sends an initialization context response message to the MME, where the message carries a TEID (used for the S1-U interface) allocated by the eNodeB for a user plane and a user plane address (used for the S1-U interface) of the eNodeB.

212: The user equipment sends a direct transfer message to the eNodeB, where the message carries an attach complete message.

213: The eNodeB forwards the attach complete message to the MME.

214: After the MME receives the initialization context response message (step 211) and the attach complete message (step 213), the MME sends a modify bearer request message to the S-GW, where the message carries the TEID (used for the S1-U interface) allocated by the eNodeB for the user plane and the user plane address (used for the S1-U interface) of the eNodeB.

215: The S-GW sends a modify bearer response message to the MME, and starts to send (starting from 205) the temporarily stored downlink data packet to the eNodeB.

Exemplarily, the user equipment may add the power saving state to the attach request message sent to the eNodeB in step 201 shown in FIG. 2, and then the eNodeB forwards the attach request message carrying the power saving state to the MME in step 202 shown in FIG. 2. After the MME receives the attach request message, the MME may add the power saving state to the create session request message sent to the S-GW (step 204 show in FIG. 2), and the S-GW obtains the power saving state of the user equipment; or the MME may add the power saving state to the modify bearer request message sent to the S-GW (step 214 shown in FIG. 2), and the S-GW obtains the power saving state of the user equipment.

Alternatively, Specifically, the power saving state of the user equipment may be further obtained in the routing area update procedure of the user equipment. In the routing area update procedure, the MME receives a route update request message that is sent by the user equipment and that includes the power saving state; the MME delivers the indication message including the power saving state, where the indication message includes at least one of a create session request message or a modify bearer request message; and when the indication message is received, the power saving state is obtained.

Figure 3:
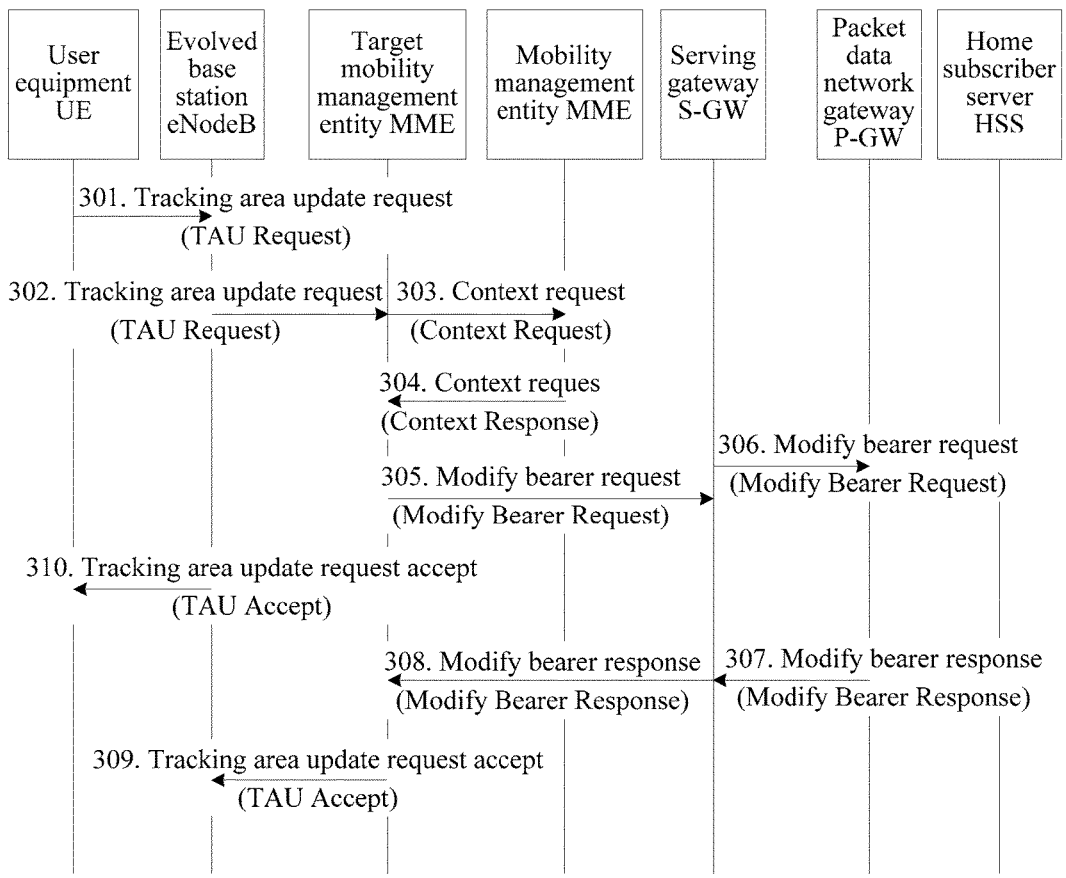
FIG. 3 is a schematic diagram of a routing area update procedure of user equipment in the prior art.

The route updating area procedure of the user equipment is shown in FIG. 3, and the procedure includes:

301: The user equipment sends a routing area update request message to the eNodeB, where the message carries a globally unique temporary identity (Globally Unique Temporary Identity, GUTI), where the identity is allocated by a source (Source) MME, includes a globally unique MME identifier (GUMMEI: Globally Unique MME Identifier), and is provided to the user equipment in an attach (Attach) procedure or a previous tracking area update (Tracking Area Update, TAU) procedure.

302: The eNodeB forwards the route update request message of the user equipment to a target (Target) MME that can currently provide a service to the UE.

303: The Target MME learns, according to the GUMMEI information, an MME at which context information of the user equipment is located, and sends a context request message to the MME (Source MME), where the message carries the GUTI.

304: The Source MME determines the context information of the user equipment according to the GUTI, where the context information of the user equipment is returned to the Target MME by means of a context response message.

305: The Target MME initiates a modify bearer request message to an S-GW, and may provide current location information and the like of the UE.

306: The S-GW forwards the modify bearer request message to a P-GW.

307: The P-GW sends a modify bearer request response message to the S-GW.

308: The S-GW forwards the modify bearer request response message to the Target MME.

309: The Target MME allocates a new GUTI to the UE, where the GUTI includes the GUMMEI of the Target MME; and the Target MME sends a routing area update accept message to the eNodeB, where the message carries the newly allocated GUTI.

310: The eNodeB forwards the routing area update accept message to the user equipment.

Exemplarily, the user equipment may add the power saving state to the route update request message sent to the eNodeB in step 301 shown in FIG. 3, and then the eNodeB forwards the route update request message carrying the power saving state to the Target MME in step 302 shown in FIG. 3. After the Target MME receives the route update request message, the Target MME adds the power saving state to the modify bearer request message sent to the S-GW (step 305 shown in FIG. 3), and the S-GW obtains the power saving state of the user equipment.

Optionally, the selection unit 20 is specifically configured to:

if the power saving state of the user equipment is that the user equipment activates the power saving mode, or the user equipment activates the discontinuous reception mode and the discontinuous reception cycle value is unknown, skip initiating service recovery for the user equipment, and skip paging the user equipment; or if the power saving state of the user equipment is that the user equipment activates the discontinuous reception mode and the discontinuous reception cycle value is known, initiate service recovery for the user equipment, so that the MME pages the user equipment according to the discontinuous reception cycle value.

Optionally, the selection unit 20 may be further specifically configured to:

if the power saving state of the user equipment is that the user equipment activates the power saving mode, or the user equipment activates the discontinuous reception mode and the discontinuous reception cycle value is unknown, skip initiating service recovery for another user equipment except the user equipment, where the another user equipment is managed by the faulty MME and whose power saving state is the same as the power saving state of the user equipment.

Optionally, the selection unit 20 may be further specifically configured to:

send a downlink data notification message including the discontinuous reception cycle value to the MME, so that the MME pages the user equipment according to the received discontinuous reception cycle value.

Specifically, the service recovery policy includes: not initiating service recovery or initiating service recovery. Not initiating service recovery refers to: the S-GW deletes the context information of the user equipment, and does not send the downlink data notification message to the MME, and the MME does not page the user equipment, and does not perform service recovery for the user equipment. Initiating service recovery refers to: the S-GW sends the downlink data notification message to the MME, and the MME pages the user equipment to complete service recovery.

It should be noted that, after activating the power saving mode, the user equipment cannot respond to paging of a network side. That the user equipment does not activate the power saving mode and does not activate the discontinuous reception mode refers to: the user equipment is in a normal state and may respond to the paging of the network side at any time. That the user equipment activates the discontinuous reception mode and the discontinuous reception cycle value is unknown refers to: the user equipment activates the discontinuous reception mode, but the network side has not obtained the discontinuous reception cycle value of the user equipment, and in this case, the user equipment cannot respond to the paging of the network side either. That the user equipment activates the discontinuous reception mode and the discontinuous reception cycle value is known refers to: the user activates the discontinuous reception mode and the network side has obtained the discontinuous reception cycle value of the user equipment, and in this case, the network side may correctly page the user equipment according to the discontinuous reception cycle value.

Figure 4:
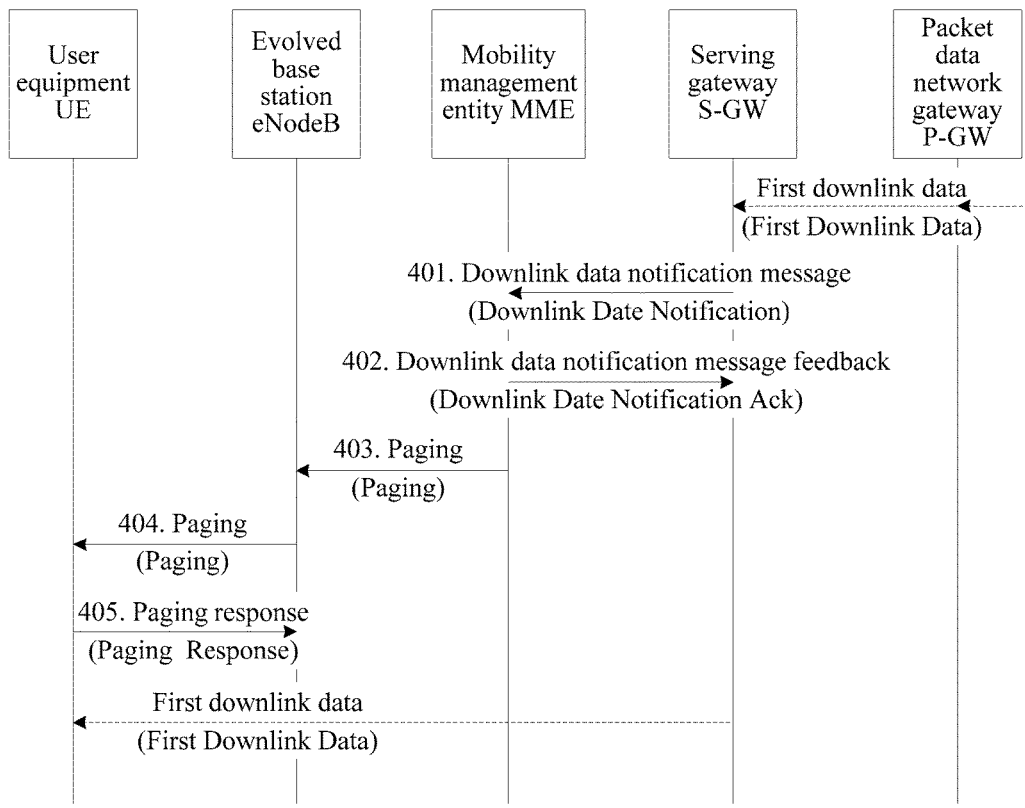
FIG. 4 is a schematic diagram of a network triggered service request procedure in the prior art.

A service recovery mechanism is described below:

Because an MME maintains a large amount of PDN connection of user equipment, after the MME is faulty (for example, the MME is restarted), to recover service of the user equipment, the service recovery mechanism may be used. The service recovery mechanism is similar to a network triggered service request procedure. As shown in FIG. 4, the network triggered service request procedure is:

401: After an S-GW receives a downlink data packet of user equipment, the S-GW sends a downlink data notification message to an MME.

402: After receiving the downlink data notification message, the MME searches for corresponding user equipment context, and returns an acknowledgement message to the S-GW.

403: The MME initiates paging on all eNodeBs in a tracking area list (Tracking Area List, TAI) at which the user equipment is located, where a paging message sent to the eNodeB carries an identifier (an IMSI, P-TMSI, or the like) of the user equipment, a paging priority, a paging DRX value, and the like.

404: The eNodeB pages the user equipment according to the received paging message.

405: The user equipment responds to the paging, initiates a service request procedure, reattaches to an EPS network, establishes a user plane, and starts to prepare to receive the downlink data packet.

A procedure of the service recovery mechanism is: after the S-GW detects that the MME is faulty, the S-GW continues to keep the context information of the user equipment; and after receiving the downlink data packet of the user equipment, the S-GW sends the downlink data notification message to any MME (an MME after restart or another MME, where in the network triggered service request procedure shown in FIG. 4, the S-GW sends the downlink data notification message to the MME storing the context information of the user equipment), and then step 402, step 403, step 404, and step 405 in the network triggered service request procedure are performed, thereby implementing service recovery.

It should be noted that, a difference between the procedure of the service recovery mechanism and the network triggered service request procedure lies in step 401.

In the network troubleshooting device provided in this embodiment of the present invention, a power saving state of user equipment is obtained; and if it is detected that a mobility management entity MME managing the user equipment is faulty, a service recovery policy is selected for the user equipment according to the power saving state, where the service recovery policy includes: not initiating service recovery or initiating service recovery. Therefore, the service recovery policy can be determined according to the power saving state of the user equipment after the MME is faulty, and unnecessary consumption of network resources can be reduced.

Figure 5:
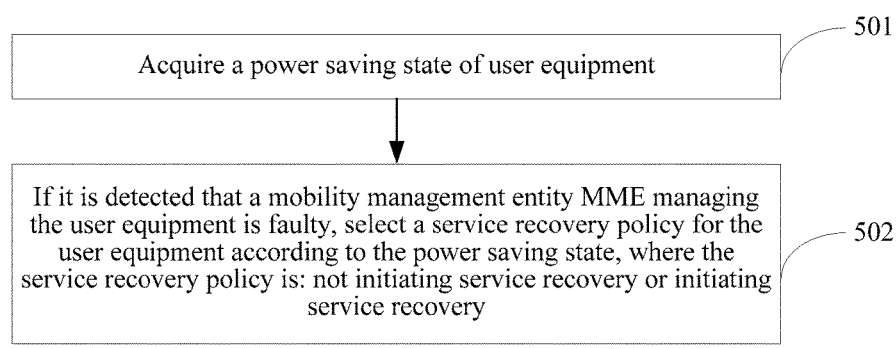
FIG. 5 is a first schematic flowchart of a network troubleshooting method according to an embodiment of the present invention.

An embodiment of the present invention provides a network troubleshooting method. As shown in FIG. 5, the method includes:

501: Obtain a power saving state of user equipment.

The power saving state of the user equipment includes:

the user equipment activates a power saving mode; or the user equipment activates a discontinuous reception mode and a discontinuous reception cycle value is unknown; or the user equipment activates a discontinuous reception mode and a discontinuous reception cycle value is known.

502: If it is detected that a mobility management entity MME managing the user equipment is faulty, select a service recovery policy for the user equipment according to the power saving state, where the service recovery policy includes: not initiating service recovery or initiating service recovery.

In the network troubleshooting method provided in this embodiment of the present invention, a power saving state of user equipment is obtained; and if it is detected that a mobility management entity MME managing the user equipment is faulty, a service recovery policy is selected for the user equipment according to the power saving state, where the service recovery policy includes: not initiating service recovery or initiating service recovery. Therefore, the service recovery policy can be determined according to the power saving state of the user equipment after the MME is faulty, and unnecessary consumption of network resources can be reduced.

Figure 6:
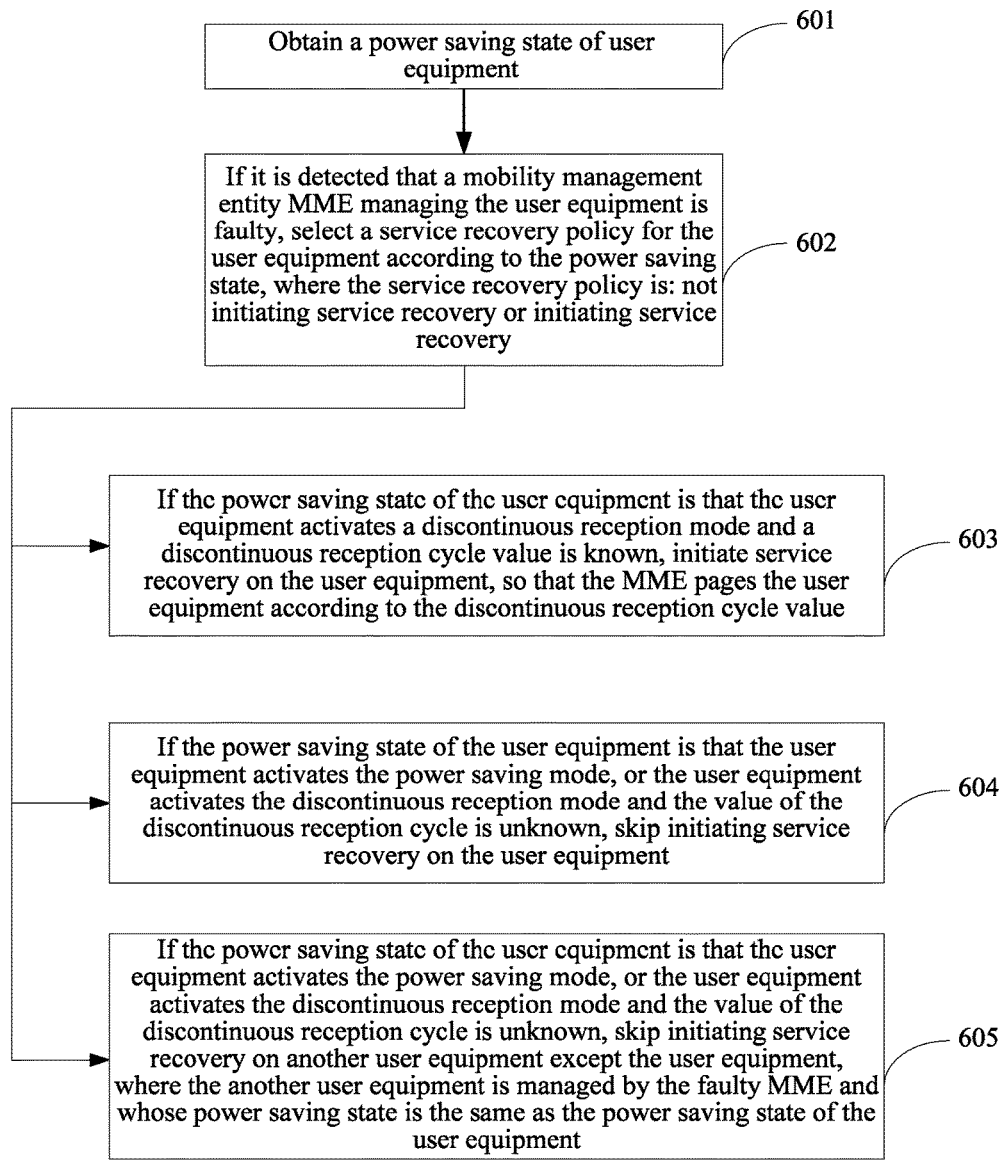
FIG. 6 is a second schematic flowchart of a network troubleshooting method according to an embodiment of the present invention.

To make a person skilled in the art more clearly understand the technical solutions provided in the embodiments of the present invention, the network troubleshooting method provided in the embodiments of the present invention is described in detail by using a specific embodiment. As shown in FIG. 6, the method includes:

601: Obtain a power saving state of user equipment.

The power saving state of the user equipment includes: the user equipment activates a power saving mode; or the user equipment activates a discontinuous reception mode and a discontinuous reception cycle value is unknown; or the user equipment activates a discontinuous reception mode and a discontinuous reception cycle value is known.

Specifically, the power saving state of the user equipment may be obtained in an attach procedure of the user equipment. In the attach procedure, an MME receives an attach request message that is sent by the user equipment and that includes the power saving state; the MME delivers an indication message including the power saving state, where the indication message includes at least one of a create session request message or a modify bearer request message; and when the indication message is received, the power saving state is obtained.

Exemplarily, FIG. 2 is used as an example for description. The user equipment may add the power saving state to the attach request message sent to the eNodeB in step 201, and then the eNodeB forwards the attach request message carrying the power saving state to the MME in step 202. After the MME receives the attach request message, the MME may add the power saving state to the create session request message sent to the S-GW (step 204), and the S-GW obtains the power saving state of the user equipment; or the MME may add the power saving state to the modify bearer request message sent to the S-GW (step 214), and the S-GW obtains the power saving state of the user equipment.

Specifically, the power saving state of the user equipment may also be obtained in a routing area updating area procedure of the user equipment. In the routing area update procedure, the MME receives the route update request message that is sent by the user equipment and that includes the power saving state; the MME delivers the indication message including the power saving state, where the indication message includes: at least one of a create session request message or a modify bearer request message; and when the indication message is received, the power saving state is obtained.

Exemplarily, FIG. 3 is used as an example for description. The user equipment may add the power saving state to the route update request message sent to the eNodeB in step 301, and then the eNodeB forwards the route update request message carrying the power saving state to the Target MME in step 302. After the Target MME receives the route update request message, the Target MME adds the power saving state to the modify bearer request message sent to the S-GW (step 305), and the S-GW obtains the power saving state of the user equipment.

602: If it is detected that an MME managing the user equipment is faulty, select a service recovery policy for the user equipment according to the power saving state of the user equipment.

Specifically, the service recovery policy includes: not initiating service recovery or initiating service recovery. Not initiating service recovery refers to: the S-GW deletes the context information of the user equipment, and does not send the downlink data notification message to the MME, and the MME does not page the user equipment, and does not perform service recovery for the user equipment. Initiating service recovery refers to: the S-GW sends the downlink data notification message to the MME, and the MME pages the user equipment to complete service recovery.

It should be noted that, after activating the power saving mode, the user equipment cannot respond to paging of a network side. That the user equipment does not activate the power saving mode and does not activate the discontinuous reception mode refers to: the user equipment is in a normal state and may respond to the paging of the network side at any time. That the user equipment activates the discontinuous reception mode and the discontinuous reception cycle value is unknown refers to: the user activates the discontinuous reception mode, but the network side has not obtained the discontinuous reception cycle value of the user equipment, and in this case, the user equipment cannot respond to the paging of the network side either. That the user equipment activates the discontinuous reception mode and the discontinuous reception cycle value is known refers to: the user activates the discontinuous reception mode and the network side has obtained the discontinuous reception cycle value of the user equipment, and in this case, the network side may correctly page the user equipment according to the discontinuous reception cycle value.

603: If the power saving state of the user equipment is that the user equipment activates a discontinuous reception mode and a discontinuous reception cycle value is known, initiate service recovery for the user equipment, so that the MME pages the user equipment according to the discontinuous reception cycle value.

Exemplarily, after the S-GW detects that the MME managing the user equipment is faulty, the power saving state of the user equipment is that the user equipment activates the discontinuous reception mode, where the discontinuous reception cycle value is known. In this case, the S-GW sends the downlink data notification message to an MME after restart or another MME, and service recovery is performed on the user equipment according to the procedure of the service recovery mechanism mentioned in step 203.

604: If the power saving state of the user equipment is that the user equipment activates the power saving mode, or the user equipment activates the discontinuous reception mode and the discontinuous reception cycle value is unknown, skip initiating service recovery for the user equipment.

Exemplarily, after the S-GW detects that the MME managing the user equipment is faulty, and if the power saving state of the user equipment is that the user equipment activates the power saving mode, or the user equipment activates the discontinuous reception mode and the discontinuous reception cycle value is unknown, the S-GW deletes the context information of the user equipment, and does not send the downlink data notification message to an MME after restart or another MME, thereby avoiding a waste of network resources caused by the fact that the MME blindly pages the user equipment.

605: If the power saving state of the user equipment is that the user equipment activates the power saving mode, or the user equipment activates the discontinuous reception mode and the discontinuous reception cycle value is unknown, skip initiating service recovery for another user equipment except the user equipment, where the another user equipment is managed by the faulty MME and whose power saving state is the same as the power saving state of the user equipment.

Exemplarily, after the S-GW detects that the MME managing the user equipment is faulty, and if the power saving state of the user equipment is that the user equipment activates the power saving mode, or the user equipment activates the discontinuous reception mode and the discontinuous reception cycle value is unknown, another user equipment except the user equipment, where the another user equipment is managed by the faulty MME and whose power saving state is the same as the power saving state of the user equipment cannot be paged by the network side either. Therefore, the S-GW also deletes context information of the user equipment, and does not send the downlink data notification message to the MME after restart or another MME, thereby avoiding a waste of network resources caused by the fact that the MME blindly pages the user equipment.

In the network troubleshooting method provided in this embodiment of the present invention, a power saving state of user equipment is obtained; and if it is detected that a mobility management entity MME managing the user equipment is faulty, a service recovery policy is selected for the user equipment according to the power saving state, where the service recovery policy includes: not initiating service recovery or initiating service recovery. Unnecessary paging on user equipment activating a power saving mode can be avoided after an MME is faulty, correct paging may be performed on user equipment in which a discontinuous reception mode is activated and a discontinuous reception cycle value is known, so as to recover a service.

Figure 7:
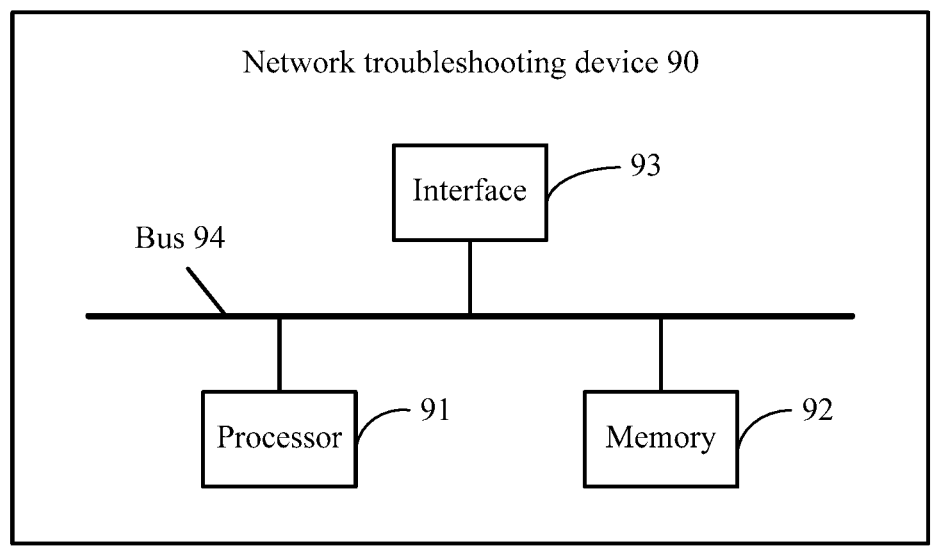
FIG. 7 is a schematic structural diagram of another network troubleshooting device according to an embodiment of the present invention.

An embodiment of the present invention provides another network troubleshooting device. As shown in FIG. 7, the device 90 includes: a bus 94, and a processor 91, a memory 92, and an interface 93 that are connected to the bus 94, where the interface 93 is configured to perform communication; the memory 92 is configured to store computer code, and the processor 91 executes the computer code to:

obtain a power saving state of user equipment; and if it is detected that a mobility management entity MME managing the user equipment is faulty, select a service recovery policy for the user equipment according to the power saving state, where the service recovery policy includes: not initiating service recovery or initiating service recovery.

Optionally, the power saving state includes:

the user equipment activates a power saving mode; or the user equipment activates a discontinuous reception mode and a discontinuous reception cycle value is unknown; or the user equipment activates a discontinuous reception mode and a discontinuous reception cycle value is known.

Optionally, that the processor 91 executes the computer code to obtain a power saving state of user equipment may specifically include:

in an attach procedure or a routing area update procedure, receiving an indication message that is delivered by the MME and that includes the power saving state, where the indication message includes at least one of a create session request message or a modify bearer request message.

Optionally, that the processor 91 executes the computer code to select a service recovery policy according to the power saving state may specifically include:

if the power saving state of the user equipment is that the user equipment activates the power saving mode, or the user equipment activates the discontinuous reception mode and the discontinuous reception cycle value is unknown, skipping initiating service recovery for the user equipment, and skipping paging the user equipment; or if the power saving state of the user equipment is that the user equipment activates the discontinuous reception mode and the discontinuous reception cycle value is known, initiating service recovery for the user equipment, so that the MME pages the user equipment according to the discontinuous reception cycle value.

Optionally, that the processor 91 executes the computer code to select a service recovery policy according to the power saving state may further specifically include:

if the power saving state of the user equipment is that the user equipment activates the power saving mode, or the user equipment activates the discontinuous reception mode and the discontinuous reception cycle value is unknown, skipping initiating service recovery for another user equipment except the user equipment, where the another user equipment is managed by the faulty MME and whose power saving state is the same as the power saving state of the user equipment.

Optionally, that the processor 91 executes the computer code to initiate service recovery for the user equipment, so that the MME pages the user equipment according to the discontinuous reception cycle value may specifically include:

sending a downlink data notification message including the discontinuous reception cycle value to the MME, so that the MME pages the user equipment according to the received discontinuous reception cycle value.

In the another network troubleshooting device provided in this embodiment of the present invention, a power saving state of user equipment is obtained; and if it is detected that a mobility management entity MME managing the user equipment is faulty, a service recovery policy is selected for the user equipment according to the power saving state, where the service recovery policy includes: not initiating service recovery or initiating service recovery. Therefore, the service recovery policy can be determined according to the power saving state of the user equipment after the MME is faulty, and unnecessary consumption of network resources can be reduced.

The foregoing descriptions about implementation manners allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or part of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for network troubleshooting comprising:
   obtaining, by a network device, a power saving state and a discontinuous reception cycle value of a mobile device;
   selecting, by the network device, a service recovery policy for the mobile device according to the power saving state when a mobility management entity (MME) managing the mobile device is faulty; and
   initiating service recovery for the mobile device by the MME paging the mobile device using a downlink data notification message according to the discontinuous reception cycle value.

2. The method according to claim 1, wherein the power saving state comprises:
   a) the mobile device activates a power saving mode; or
   b) the mobile device activates a discontinuous reception mode and a discontinuous reception cycle value is unknown; or
   c) the mobile device activates the discontinuous reception mode and the discontinuous reception cycle value is known.

3. The method according to claim 1, wherein the process of the obtaining the power saving state of the mobile device comprises:
   receiving, in an attach procedure or a routing area update procedure, an indication message delivered by the MME and comprising the power saving state and at least one of a create session request message or a modify bearer request message.

4. The method according to claim 2, wherein the process of the obtaining a power saving state of the mobile device comprises:
   receiving, in an attach procedure or a routing area update procedure, an indication message delivered by the MME and comprising the power saving state and at least one of a create session request message or a modify bearer request message.

5. The method according to claim 2, wherein selecting the service recovery policy according to the power saving state comprises:
   a) in case that the power saving state of the mobile device activates the power saving mode, or activates the discontinuous reception mode and the discontinuous reception cycle value is unknown, skipping initiating the service recovery for the mobile device, and skipping paging the mobile device; or
   b) in case that the power saving state of the mobile device activates the discontinuous reception mode and the discontinuous reception cycle value is known, initiating the service recovery for the mobile device, so that the MME pages the mobile device according to the discontinuous reception cycle value.

6. The method according to claim 5, wherein selecting the service recovery policy according to the power saving state further comprises:
   in case that the power saving state of the mobile device activates the power saving mode, or the mobile device activates the discontinuous reception mode and the discontinuous reception cycle value is unknown, skipping initiating service recovery for another mobile device except the mobile device, wherein the another mobile device is managed by the faulty MME and whose power saving state is the same as the power saving state of the mobile device.

7. A network device comprising:
   a communications interface configured to communicate with a network element;
   a memory configured to store computer code; and
   a processor for executing the computer code to configure the processor to perform the following:
      obtain a power saving state and a discontinuous reception cycle value of a mobile device;
      select a service recovery policy for the mobile device according to the power saving state in case that a mobility management entity (MME) managing the mobile device is faulty; and initiating service recovery for the mobile device by the MME paging the mobile device using a downlink data notification message according to the discontinuous reception cycle value.

8. The network device according to claim 7, wherein the power saving state comprises:
a) the mobile device activates a power saving mode; or
b) the mobile device activates a discontinuous reception mode and a discontinuous reception cycle value is unknown; or
c) the mobile device activates a discontinuous reception mode and a discontinuous reception cycle value is known.

9. The network device according to claim 7, wherein the processor executes the computer code to cause the network device to perform further:
in an attach procedure or a routing area update procedure, receive an indication message that is delivered by the MME and that comprises the power saving state, wherein the indication message comprises at least one of a create session request message or a modify bearer request message.

10. The network device according to claim 8, wherein the processor executes the computer code to cause the network device to perform further:
in an attach procedure or a routing area update procedure, receive an indication message that is delivered by the MME and that comprises the power saving state, wherein the indication message comprises at least one of a create session request message or a modify bearer request message.

11. The network device according to claim 8, wherein the processor executes the computer code to cause the network device to perform further:
a) in case that the power saving state of the mobile device is that the mobile device activates the power saving mode, or the mobile device activates the discontinuous reception mode and the discontinuous reception cycle value is unknown, skip initiating service recovery for the mobile device, and skip paging the mobile device; or
b) in case that the power saving state of the mobile device is that the mobile device activates the discontinuous reception mode and the discontinuous reception cycle value is known, initiate service recovery for the mobile device, so that the MME pages the mobile device according to the discontinuous reception cycle value.

12. The network device according to claim 11, wherein the processor executes the computer code to cause the network device to perform further:
in case that the power saving state of the mobile device is that the mobile device activates the power saving mode, or the mobile device activates the discontinuous reception mode and the discontinuous reception cycle value is unknown, skip initiating service recovery for another mobile device except the mobile device, wherein the another mobile device is managed by the faulty MME and whose power saving state is the same as the power saving state of the mobile device.

13. A non-transitory, computer readable medium in a network device including the following instructions for execution by a processor:
instructions for obtaining a power saving state and a discontinuous reception cycle value of a mobile device;
instructions for selecting a service recovery policy for the mobile device according to the power saving state when a mobility management entity (MME) managing the mobile device is faulty; and
initiating service recovery for the mobile device by the MME paging the mobile device using a downlink data notification message according to the discontinuous reception cycle value.

14. The non-transitory, computer readable medium according to claim 13, wherein the power saving state comprises:
a) activating a power saving mode; or
b) activating a discontinuous reception mode and a discontinuous reception cycle value is unknown; or
c) activating a discontinuous reception mode and a discontinuous reception cycle value is known.

15. The non-transitory, computer readable medium according to claim 13, wherein the instructions for obtaining the power saving state of the mobile device comprises:
receiving, in an attach procedure or a routing area update procedure, an indication message delivered by the MME and comprising the power saving state and at least one of a create session request message or a modify bearer request message.

16. The non-transitory, computer readable medium according to claim 13, wherein selecting the service recovery policy according to the power saving state comprises:
a) skipping initiating the service recovery for the mobile device and skipping paging the mobile device in a case where the power saving mode of the mobile device activates a discontinuous reception mode and the discontinuous reception cycle value is unknown; or
b) initiating the service recovery for the mobile device so that the MME pages the mobile device according to the discontinuous reception cycle value in a case where the power saving state of the mobile device activates the discontinuous reception mode and the discontinuous reception cycle value is known.

17. The non-transitory, computer readable medium according to claim 13, wherein selecting the service recovery policy according to the power saving state further comprises:
skipping initiating the service recovery for another mobile device except the mobile device in a case that the power saving state of the mobile device activates the power saving mode, or activates a discontinuous reception mode and the discontinuous reception cycle value is unknown, wherein the another mobile device is managed by the faulty MME and whose power saving state is the same as the power saving state of the mobile device.

* * * * *